United States Patent [19]

Manchak, Jr.

[11] 4,184,958
[45] Jan. 22, 1980

[54] APPARATUS FOR TREATING SUMPS

[76] Inventor: Frank Manchak, Jr., 635 Grove Ln., Santa Barbara, Calif. 93105

[21] Appl. No.: 803,794

[22] Filed: Jun. 6, 1977

Related U.S. Application Data

[62] Division of Ser. No. 406,349, Oct. 15, 1973, Pat. No. 4,028,240.

[51] Int. Cl.$^2$ .............................. B01F 3/14; E02F 3/60
[52] U.S. Cl. ...................................... 210/170; 37/136; 366/261; 366/335
[58] Field of Search .............. 37/71, 135, 136, DIG. 5; 210/170, 198 R, 205, 209, 219, 241; 366/332, 334, 335, 261

[56] References Cited

U.S. PATENT DOCUMENTS

| | | | |
|---|---|---|---|
| 1,867,017 | 7/1932 | Mehner et al. | 366/261 |
| 2,648,918 | 8/1953 | Mazzella | 37/135 |
| 2,669,042 | 2/1954 | Swank | 37/135 |
| 3,768,571 | 10/1973 | Renfrue | 37/135 |

FOREIGN PATENT DOCUMENTS 229301  2/1969  U.S.S.R. ........................ 37/71

*Primary Examiner*—Thomas G. Wyse
*Attorney, Agent, or Firm*—William C. Babcock

[57] ABSTRACT

Lime, preferably as calcium oxide, is mixed with the contents of sumps, such as oil well sumps, and these generally have a pasty or plastic consistency. The calcium oxide reacts with the materials present and also dehydrates the contents of the sump, causing the sump contents to stiffen. This mixing is performed by a drag line scoop that carries calcium oxide through the sump contents, mixing and blending the oxide and contents as it moves because of the unique construction of the mixing scoop. Once the mixing and blending is complete and reaction of the calcium oxide and the contents is complete, the sump contents are dredged and deposited on high ground to dry by the combined action of sun and air. Drying periods may range from several days to several weeks and the material thereupon becomes a dry, hard and stable type of soil suitable for fill purposes and which, when neutralized with acid, also may be suitable for agricultural purposes.

3 Claims, 13 Drawing Figures

U.S. Patent    Jan. 22, 1980    Sheet 1 of 3    4,184,958
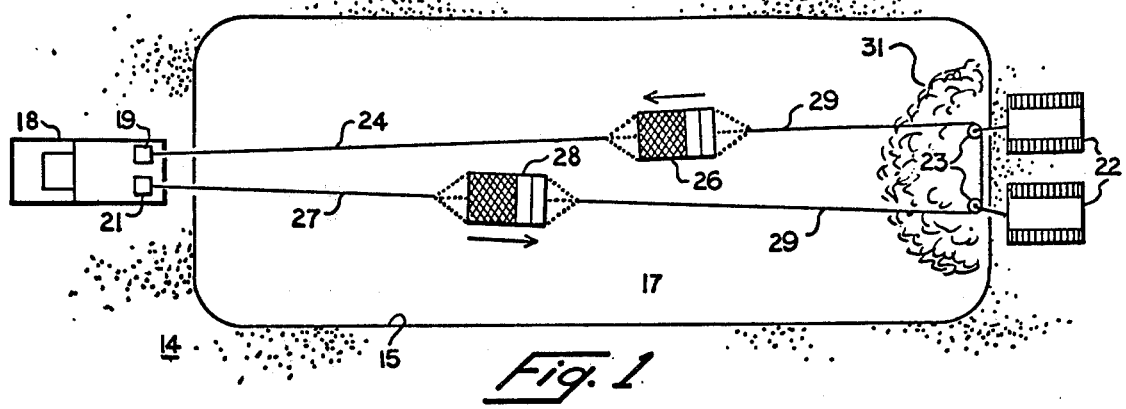
Fig. 1
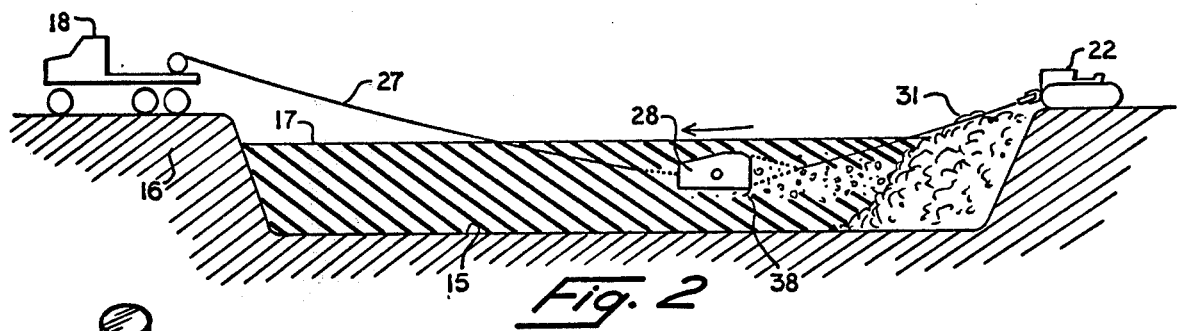
Fig. 2
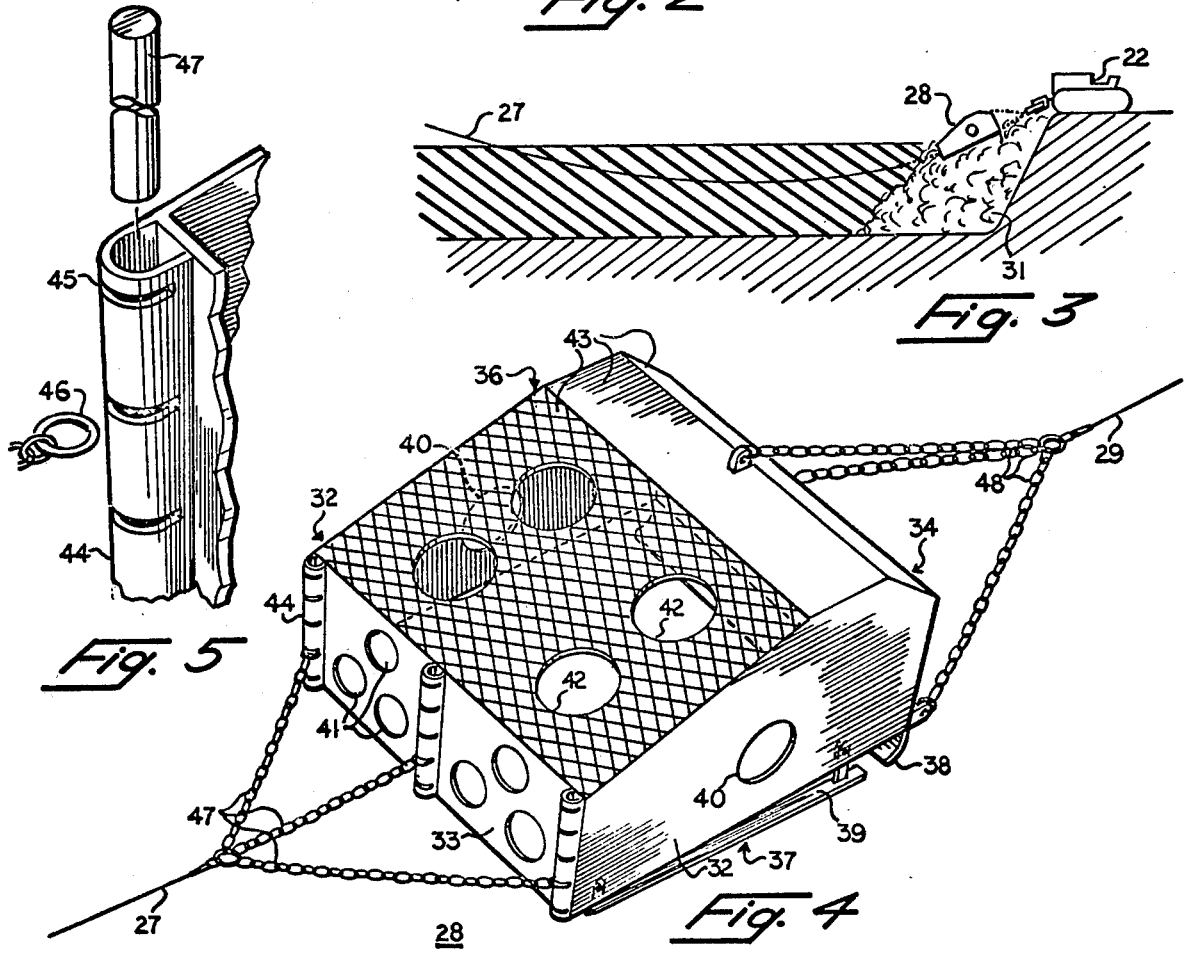
Fig. 3
Fig. 5
Fig. 4

APPARATUS FOR TREATING SUMPS

This is a division of application Ser. No. 406,349 filed on Oct. 15, 1973 and identified by the title METHOD AND APPARATUS FOR TREATING SUMPS, now U.S. Pat. No. 4,028,240.

This invention relates to a method and apparatus for changing the contents of sumps into ecologically acceptable material, thus making it possible to eliminate many sumps.

The invention will be described for illustrative purposes as applied primarily to oil well sumps, and secondarily to sewage sumps. Each producing oil field has a number of sumps which are generally in the form of artificial pits 4 to 20 feet deep, varying in size from 30' by 50' to 10 acres in surface area. These sumps are used as dump sites for all kinds of liquid and viscous wastes. When a well is being drilled, the cuttings are dumped into a sump together with some of the drilling mud, which generally has a clay-like consistency. When the well is operated, leaking petroleum collects in the sumps. When water is mixed with the oil being pumped, the water is separated out, and this oily water is dumped into a sump. When wells are being serviced to increase production, acids are frequently used and these acids are dumped into a sump. Some servicing requires treatment of the well bore with chromium and arsenic and boron compounds, and these exhausted substances are dumped into sumps. Frequently the pipe lines are blown out with steam or hot water and the resulting water and tar mixture is dumped into a sump. Frequently salt water is used to process oil wells and the waste water is dumped into a sump. Oil and oil derivatives constitute 10% to 15% of the total contents of a sump, and frequently these are emulsified with water and other liquids and muds.

The physical consistency of the sump varies according to the random materials dumped. Typically, however, in the absence of a water layer, the consistency is pasty. A rock thrown into a sump will sink to about its depth, but will form an open crater around it which persists for a minute or more before the pasty material slowly closes over the rock. The material is too thick to be pumped as a liquid and too thin to be handled as a solid. It is generally very viscous, sticking to power shovels and the like, and is extremely difficult to move with conventional equipment.

Inasmuch as sumps create traps for wild fowl and wild animals, and frequently for domestic animals, there is an increasing demand for elimination of sumps, especially those not being commercially used. In addition, they are unsightly. The traditional treatment has been to dump and mix dirt into the sump and thereby soak up sufficient of the oil until the dirt-sump material can be moved by conventional equipment. The mixture is then spread to dry. This treatment has not been acceptable because the mixture bleeds oil and chemicals. Over the months and years this dirt-sump mixture oozes oil and becomes almost as objectionable as the original oil sump. This unsatisfactory type of treatment has called for an improved solution to the ecological problem of sump elimination.

I have discovered that if calcium oxide is carefully mixed with the contents of sumps, the sump material can be stabilized and used for road fill, and after suitable neutralization, for agricultural soil as well. It is ecologically acceptable as fill inasmuch as the treated materials are stabilized and insoluble to surface or ground water.

I have discovered that the calcium oxide can be most efficiently mixed in the sump pit itself, whereupon the material is sufficiently solidified so that it can be dug out of the pit with conventional equipment. It can then be recompacted in the same pit or spread out to dry for several days or weeks, and then becomes friable and brittle. The drying period is controlled by the quantity of calcium oxide induced.

I have devised a unique type of mixing equipment whereby a scoop or bucket of calcium oxide is moved through the body of the sump material and the scoop design causes the scoop to distribute the calcium oxide to the areas and in the quantities required. The mixture of sump and oxide is then extruded through holes strategically placed in the scoop, thus effecting further mixing. The mixing action is further improved by operating two scoops in side-by-side paths.

Various objects, advantages and features of the invention will be apparent in the following description and claims considered together with the drawings forming an integral part of this specification in which:

FIG. 1 is a plan view of a sump being treated by two scoops attached to drag lines wherein one end of the generally parallel drag lines passes through pulleys and the other end is attached to a winch truck.

FIG. 2 is a sectional view through the sump of FIG. 1 showing one of the scoops being moved to the left to distribute the calcium oxide throughout the body of the sump material.

FIG. 3 is a fragmentary sectional view of the same sump as in FIG. 2, but showing the scoop being positioned over a pile of calcium oxide so that it is being loaded for subsequent movement through the sump materials, as shown in FIG. 2.

FIG. 4 is a three-dimensional view of a presently preferred form of the scoop for disbursing calcium oxide through the body of the sump material.

FIG. 5 is an exploded view of the left-hand corner of the sump of FIG. 4 showing the construction of the U-shaped tube that is transversely slotted so that rings can be passed into the slots and held by means of a rod passing into the U-shape and through the rings.

TREATMENT OF SUMPS WITH CALCIUM OXIDE

Figure 6:
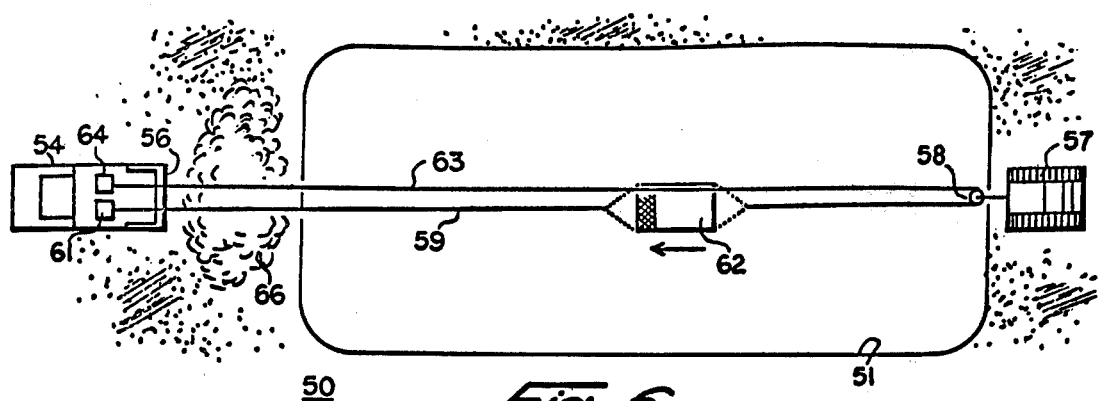
FIG. 6 is a plan view of a sump wherein a single scoop is moved by means of a conventional drag line arrangement.
Figure 7:
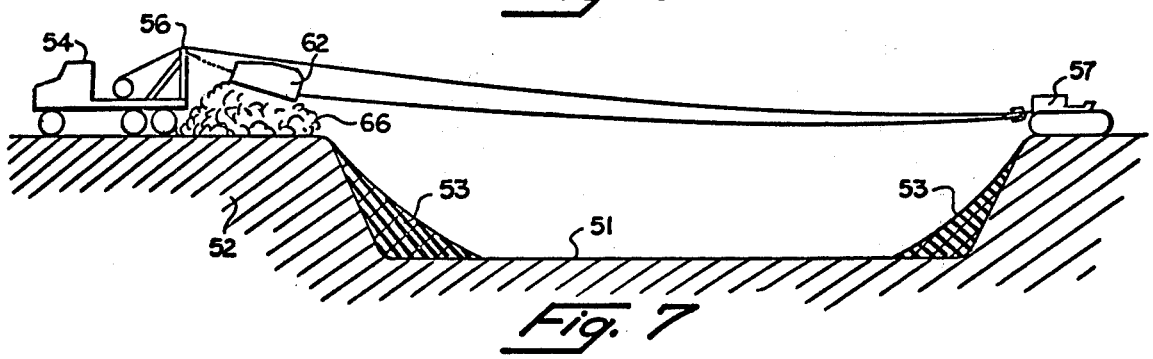
FIG. 7 is a sectional view of the sump of FIG. 6 showing the contents of the sump largely removed by means of a drag line scoop which deposits the material adjacent to the prime mover or winch truck.

Referring to FIGS. 1 through 5, there is illustrated a sump 14 including a sump pit 15 dug into native soil 16 which is filled with sump contents 17. Disposed at the left side of the sump is a winch truck 18 on which may be located a pair of winches 19 and 21 which are independently operated by a human operator located on the winch truck 18. Located on the right-hand edge of the sump 14 is a pair of tractors 22 of the crawler type which act as anchors for the drag line. A suitable tree or heavy weight could also be used as anchors but mobile anchors are preferred so that they can be moved from one location to another to work different parts of the sump contents. Connected to each tractor 22 is a pulley 23.

Referring now to the left-hand side of FIGS. 1 and 2, leading from winch 19 is a cable or wire rope 24 connected to the front end of a scoop 26. Connected to the winch 21 is a wire rope 27 connected to the front end of a scoop 28. Connected to the back end or to the right in FIGS. 1 and 2 of each scoop 26 and 28 is a wire rope 29 which is threaded through the pulleys 23. Pulling on one of the wire ropes 24 or 27 and slacking off on the other will cause the two scoops 26 and 28 to move in opposite directions. The wire rope 24 connected to scoop 26 and that portion of wire rope 29 connected to scoop 26 forms one drag line of a pair, and the other drag line consists of the wire rope 27 and the portion of the rope 29 connected to the scoop 28. These two drag lines are roughly parallel with each other and will result in the two scoops 26 and 28 working in paths that are very close to each other. The two scoops will be closest to each other at their mid point, as illustrated in FIG. 1, and at other places in their paths of travel they will be quite separated.

Referring now to FIGS. 1, 2 and 3, there is located at the right end of the sump pit 15 a pile of calcium oxide 31 which is preferably dumped there from dump trucks. To fill the scoop 28 with calcium oxide the drag lines 24–29 and 27–29 are operated by the winches 19 and 21 so as to lift the scoop 28 close to the tractor 22, whereupon it is elevated above the top surface of the sump contents 17. The operator then slacks off on the wire rope 27 which causes the scoop 28 to drop down on the pile of calcium oxide 31. The bottom of each scoop 26–28 is open, and the weight of the scoop dropping down on the pile causes the scoop to enclose a quantity of calcium oxide approximately the same volume as the interior of each scoop 26–28. The drag line 27 is then tightened, pulling the scoop 28 down along the surface of the pile of oxide 31, whereupon it enters the sump contents 17. As will be explained in more detail with reference to FIG. 4, the front end of each scoop 26–28 is apertured so that sump contents enter the front of the scoop and mix with the calcium oxide on the interior of the scoop. Further, each scoop has a blade at the rear end which picks up sump contents and causes it to move into the interior of each scoop with a rolling action. This blade action further causes mixing of the sump contents 17 with the calcium oxide and the calcium oxide is thereby distributed along the entire path of travel of the scoop 28. In this fashion calcium oxide is injected into the sump contents 17 and simultaneously mixed within the scoop with the oxide by extruding through various holes in the scoop and by virtue of the rolling action of the blade. During this injection action each scoop 26 and 28 preferably travels below the surface of the sump for maximum benefit.

Referring to FIGS. 4 and 5, one scoop 28 is illustrated and its construction is identical to that of scoop 26. The scoop 28 has sidewalls 32, a front 33 and a rear 34. These four walls define a top area 36 which is generally horizontal and a bottom area 37 which is generally horizontal. One of these two areas may be open and at present I prefer to have the bottom horizontal area 37 open so as to effect loading as just described with respect to FIG. 3. Secured to the lower edge of the back 34 is a curved blade 38 which acts on the sump contents 17 as the scoop is pulled forwardly, as shown in FIG. 2, to direct the sump contents to the interior of the scoop with a rolling action. This rolling action of the sump contents brings the contents in contact with the calcium oxide on the interior of the scoop 28 causing mixing as the rolling action continues. On the lower edge of each side 32 is an adjustable runner 39 which regulates the depth of cut of the blade 38 when operating on firm material, but which has little effect on the contents of a sump when they are soupy or fairly fluid.

Provided particularly in accordance with the invention are apertures on the various sides of the scoop 28. The apertures may be of any desired shape, such as square, rectangular or round, and the main requirement is a minimum dimension such that the apertures do not act as a net to restrain the sump contents within the scoop 28. Accordingly, I prefer apertures of a minimum dimension of about 8 inches. The front 33 may contain sufficient apertures 41 so that at least 40% of the front is open to the passage of sump contents. The horizontal top area has apertures 42 that occupy at least 20% of the surface. The sidewalls 32 may contain apertures 40, and these are preferably less than 20% of the area. The top horizontal area 36 may be formed of solid sheet metal 43 towards the rear of the scoop 28 and the rest of the horizontal top area may be formed of mesh such as expanded metal. When the openings through the expanded metal are less than about 4 inches in dimension, these act substantially as a solid surface in confining the sump contents within the scoop. Preferably the rear third of the scoop is not apertured so as to hold the lime oxide therein for a maximum length of time as it is removed by the action of the sump contents moving through the scoop.

Various means of attaching a harness from the front of the scoop to the drag line 27 may be employed, and at present I prefer the structure illustrated in detail in FIG. 5. Formed on the front 33 of the scoop 28 are a plurality of vertical members 44 which have a horizontal cross section of a U-shape. Horizontal slots 45 are cut into these vertical U members and these permit the insertion of a ring 46. The ring is locked in each slot 45 by a vertical pin 47, preferably formed of high strength steel such as drill rod. The vertical pin 47 may be held in position by a suitable cross fastener such as a large cotter pin or bolt (not shown). By this structure illustrated in FIGS. 4 and 5 a harness consisting of three chains 47 may be connected at the desired point to adjust the attitude of the scoop with respect to the stiffness of the sump contents 17. A similar harness of three chains 48 may be connected to the rear of the scoop 28 and by a proper selection of the lengths of these chains the scoop 28 may be caused to assume a vertical position when it is returned from left to right in FIGS. 1 and 2.

OPERATION OF FIGS. 1 THROUGH 5

A human operator is located on the winch truck 18 to independently operate the two winches 19 and 21. A quantity of calcium oxide is dumped at the right end of the sump pit 15 to form the pile 31, and the scoops 26 and 28 are operated to pick up this lime and inject it into the sump contents 17 by moving through the sump, preferably below the surface, and distributing the calcium oxide as the scoops move. As illustrated in FIG. 1, the scoop 26 is moving to the left or in the forward direction, whereas the scoop 26 is moving to the right in an empty condition to pick up additional lime from the pile 31. The scoop 26 returning may be manipulated so as to form a minimum resistance, and may be elevated above the surface of the sump by the tautness of the lines 27 and 29, or by regulating the harness 48 (FIG. 4) the scoop may be caused to be skidded across the surface of the sump on its rear end.

The action of the scoop 28 in injecting calcium oxide into the sump contents 17 is shown in FIG. 2. There it will be noted that the blade 38 causes the sump contents to be rolled or swirled to the interior of the scoop 28 and at the same time the apertures 41 (FIG. 4) in the front of the scoop allow the sump contents to move through the scoop to also pick up oxide that is located there. When the scoop 28 has finished its travel to the left to the winch truck 18 the entire contents will be injected into the sump contents and distributed along the path of travel.

The action in loading the scoop is illustrated in FIG. 3 wherein the scoop 28 is lifted above the surface of the pile of lime 31 and then dropped down upon it, and the weight of the empty scoop 28 causes it to enclose a quantity of lime oxide that is then distributed, as illustrated in FIG. 2, throughout the sump contents. The lime oxide 31 is dumped in large quantities at one end of the sump pit 15 to form a pile 31.

DREDGING APPARATUS FIGS. 6 THROUGH 9

Referring to FIGS. 6 through 9 there is illustrated the method of dredging out a sump after it has been treated with calcium oxide and there is illustrated also a preferred form of scoop for effecting this dredging or drag line operation. A sump 50 is formed by a pit 51 dug into earth 52 and the pit contents are designated by numeral 53. Positioned at one end of the pit 51 is a winch truck 54 which may be identical to the winch truck of FIGS. 1 and 2 with the exception that here it is desirable to have a pulley tower 56 formed on the end of the truck so that the scoop operated may be elevated 8 or 10 feet off the surface of the ground to improve the ability of piling the dredged material. Disposed on the right end of the pit 51 is an anchor 57, preferably in the form of a crawler type tractor, to which a pulley 58 may be connected.

Stretching between the anchor 57 and the winch truck 54 is a drag line 59 connected at one end to a winch 61 on the truck and the other end of which is connected to a scoop 62. The drag line consists of another segment 63 connected to the right end of the scoop 62 and passing through the pulley 58 to return to a winch 64 on the winch truck. Referring particularly to FIG. 2 there is illustrated the dumping operation whereby the scoop 62 is elevated above ground level so that its contents fall by gavity out of the open bottom of the scoop and form a pile 66. This dredging is done by conventional drag line techniques and consists of returning the bucket 62 to the anchor 57, whereupon sufficient slack is allowed so that the bucket 62 drops by gravity onto the sump contents 53 and pulling of the scoop 62 toward the winch truck 54 picks up a load of the sump contents and when the bucket is elevated, as shown in FIG. 2, the contents drop out.

Figure 8:
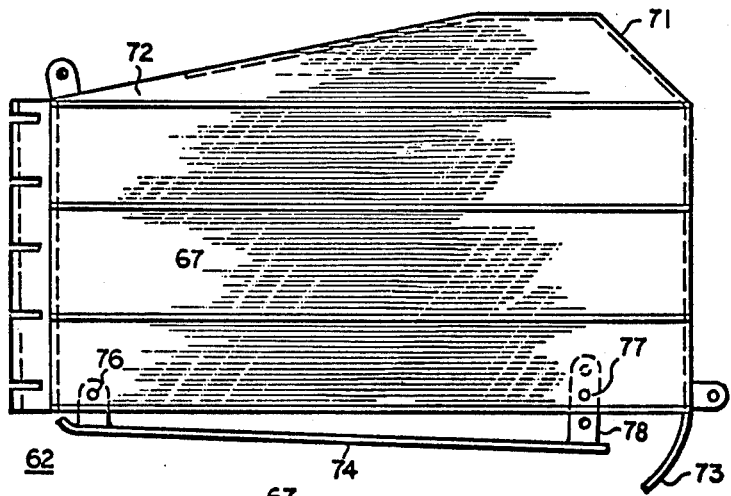
FIG. 8 is an elevation view of a presently preferred embodiment of the scoop of FIGS. 6 and 7 used for ordinary dredging, as contrasted to mixing as shown in FIGS. 1 through 4.
Figure 9:
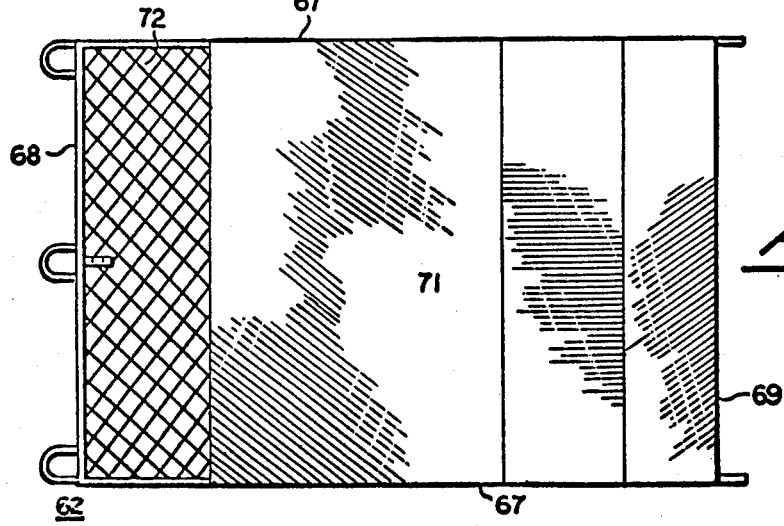
FIG. 9 is a top view of the scoop of FIG. 8 showing the left-hand or front portion of the top being comprised of mesh or expanded metal that permits water to escape.
Figure 10:
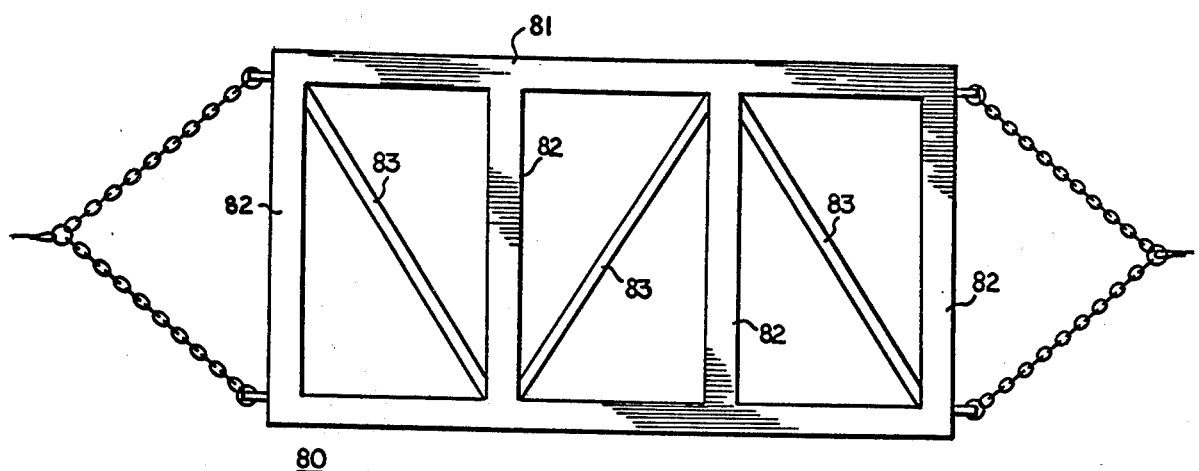
FIG. 10 is a plan view of a combined leveler and scraper which is used for treatment of the sumps.

Illustrated in FIGS. 8 and 9 are views of the bucket 62 showing its construction. Not only can this bucket be used for removal of the contents of sumps, but it can also be used in ordinary dredging wherein material is removed from the bottom of lakes, rivers, oceans, etc. The bucket 62 has sidewalls 67 which may be suitably reinforced with outwardly projecting ribs and may have a front 68 and a rear 69. The scoop 62 has a top 71 which is generally solid, except at the forward end, about 10% of the area of the top is formed of mesh 72 which may be expanded metal and preferably the greatest dimension of the mesh is less than 4 inches. This mesh allows the escape of water when dredging extremely liquid materials, or when dredging the bottoms of lakes and rivers. The bottom of the scoop 62 is preferably open and at the rear edge thereof is located a curved blade 73 which scoops up material to deposit it on the interior of the scoop. The depth of cut of the blade 73 is determined by its vertical dimension, but lesser cuts may be made by virtue of a skid 74 on each side of the bucket which is pivoted at the front at 76 and which has an adjustable depth setting by a bolt 77 passing through one of a plurality of holes in an upright support 78. The elevation view of the scoop 62 is shown in FIG. 8 and the scoop may have a hump back design if desired, whereby the rear portion of the scoop has a greater capacity than the front portion to accommodate the scooping action of the blade 73. The scoop 62 may be harnessed to drag lines in the same fashion as the scoops of FIGS. 1 through 4 and as shown in most detail in FIG. 4.

COMBINED LEVELER AND SCRAPER FIGS. 10 THROUGH 13

Figure 11:
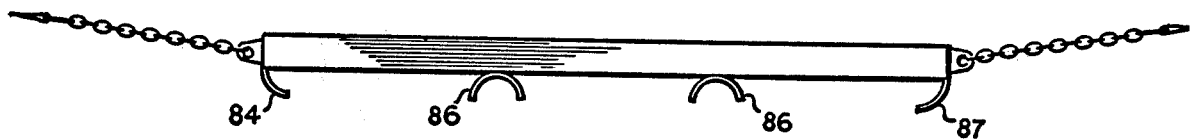
FIG. 11 is an elevation view of the combined scraper and leveler of FIG. 10.

Illustrated in FIGS. 10 through 13 is a scraper which is also useful as a leveler in treating sumps. A scraper 80 may be formed of a rectangular frame 81 which may be conveniently made by welding tubular steel together. The frame may have cross bars 82 and diagonal braces 83. Welded or otherwise secured to the bottom of each cross bar 82 is a pipe segment and a forward or left-hand segment in FIG. 11 may be a quarter-section of a pipe which points toward the rear of the frame and is designated by the numeral 84. The two center cross bars 82 may have a semi-circular pipe welded or otherwise secured to them designated by the numeral 86. At the rear or right in FIG. 11 is another quarter-section of pipe pointing towards the front, designated as 87.

Figure 12:
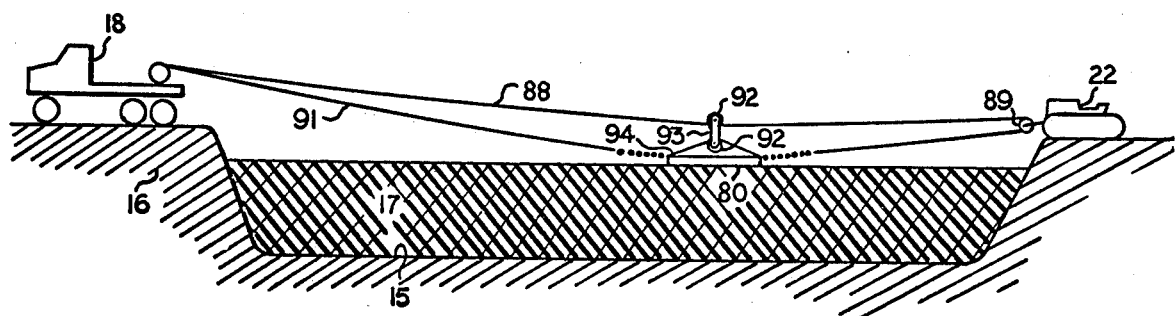
FIG. 12 is an elevation view of a sump wherein a drag line has been established for pulling the scraper of FIGS. 10 and 11 and wherein the height is controlled by a pulley support for the scraper which rides along the upper line of the drag line pair.
Figure 13:
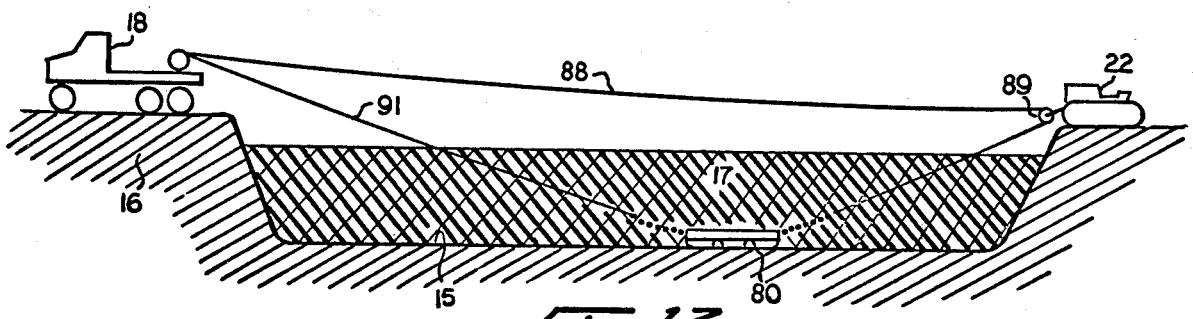
FIG. 13 is a view of the same sump as shown in FIG. 12, wherein the combined leveler and scraper is used to scrape the bottom of the sump pit to loosen all sump contents for thorough mixing.

When it is desired to use the scraper or leveler, the scoop is disconnected from the drag line and the device 80 is substituted for it. Shown in FIGS. 12 and 13 are uses of this device, first as a leveler in FIG. 12 and as a scraper in FIG. 13. Referring to FIG. 12, the winch truck 18 may have a drag line 88 which passes through a pulley 89 at the anchor 22 at the right edge of the sump pit 15. The combined leveler and scraper 80 is secured to one end of the drag line 88 and the other end is secured to a drag line 91 connected to the other winch of the prime mover 18. The elevation of the leveler 80 is maintained by means of a pair of pulleys 92 joined by a cross bar 93 and the lower pulley 92 has a wire rope 94 passing over it connected to each end of the leveler 80. In this fashion the operator of the winch truck 18 maintains the level of the leveler 80 as it is pulled across the surface of the sump contents 17. This leveling is desirable for the curing of the sump contents after calcium oxide has been mixed with the contents.

Shown in FIG. 13 is the use of the device 80 as a scraper. Frequently, in sumps the bottom layers of the materials are hard and dense and are not fluid and plastic as are the upper layers. Accordingly, it is necessary to scrape these loose from the bottom of the pit 15 so that lime oxide might be mixed with these contents. The scraper 80 is sufficiently heavy so that it will drop by gravity through the pasty or semi-fluid layer of the sump contents 17 whereupon it may be dragged across the harder sump contents and will break these loose from the bottom so that thereafter they can be worked by the scoops to distribute calcium oxide as described with reference to FIGS. 1 through 5. The scraper 80 is moved back and forth in accordance with conventional drag line techniques by the operator of the winch truck operating the drums of winches associated with the two drag line segments 88 and 91. Under some conditions the scraper may dig into the bottom of the pit and other conditions may give rise to layers spaced from the bottom. For these cases, the scraper 80 may be held at any desired level by lengthening the bar 93 or substituting a wire rope for the bar so that the rope 88 will be above the sump level while supporting the scraper 80 below the sump surface.

THE ACTION OF LIME ON SUMPS

Although the action of lime on certain materials has been known for centuries in the making of mortars and cements, the use of lime on the bituminous contents of oil well sumps has been little appreciated. The lime acts to stiffen up the contents of the sumps and permit the handling of the sump contents so stiffened as regular earth materials are handled. The contents of a sump are normally very soupy or at best pasty and their handling by any conventional material handling process has heretofore been impractical. In practicing the present invention the free-standing water is first drawn off. Frequently this water occurs as a layer on top of the oil well sumps, but also it may be disbursed throughout the body of the sump contents. In severe cases a trench has to be dredged through the center of the sump contents to allow water to accumulate in a specific area so that the water can be pumped off. The method of injecting calcium into the sump contents described with reference to FIGS. 1 through 4 is best accomplished when the pump contents are in a pasty or soupy condition of a very stiff soup. If the sump contents are harder than a paste, then water has to be added to the sump to soften it up so that the machinery of FIGS. 1 through 4 can be operated to inject calcium into the contents.

The first action of the lime in the sump contents is a violent steaming and boiling action as the lime reacts with the water present. The lime must be carried down below the surface of the sump so that this violent reaction between the quicklime and the water will permit mixing of the materials with the quicklime. This mixing action is continued until the sump contents noticeably stiffen. The amount of lime needed for a sump varies from 1½% to 5% by weight of its contents, but for spreading in thin layers not more than one foot thick, the lime can be as low as ½%. The sump contents typically weigh about 2500 pounds per cubic yard.

The reaction of the lime on the clay contents of the sump, such as the various drilling muds, is to first break up the clods and hard aggregate of drilling mud which sometimes occurs. The action of the lime on very soupy clay is to stiffen it up. The net effect of these two actions on clay is to make the entire clay contents manageable.

After the lime has been injected in the oil sump contents in the required amount, the sump is preferably leveled, as shown in FIG. 12, and allowed to stand for about 48 hours. This time period allows the lime to react with the contents of the sump. This reaction consolidtes the bituminous portions of the sump contents as well as the various chemicals and additives that are usually dumped into sumps from the treatment of oil wells. Calcium oxide in granules about the size of wheat kernels is presently preferred.

After the 48 hour or two day waiting period, the sump contents are dredged up or dug up by means of a drag line, as shown in FIGS. 6 through 9, or by other suitable earth-moving techniques. Usually, however, the stiffened up contents are still too moist and sticky to be worked by conventional earth-moving equipment, such as bulldozers. The dredged up material is spread out for drying for a period of several weeks until it is dry enough to handle by regular earth-moving equipment. The spreading should be done in layers not more than 3 feet thick. The drying should be terminated at the end of 3 weeks, as thereafter the material starts to cement together, and 4 weeks is probably a maximum. Thereafter the material may be moved to any suitable location and compacted for fill. The action of the lime on the sump contents as fill material is extremely beneficial. The lime reacting with the contents tends to seal off the mixture so that it will not be leached by water. Indeed, thoroughly compacted fill made of this lime treated sump contents appears to shed water that may come from above as by rain and appears to be impervious to ground water which may occur below the fill. This sealing off tendency of the lime is especially desirable where there is any poisonous type of materials in the sump contents, thus preventing these materials from entering the ground water or the runoff water to avoid poisoning or pollution of streams and water supplies. This cementing and sealing off action appears to be permanent.

The reaction of the calcium oxide appears to be, first, the reaction agglomerates the sump waste materials into coarse, friable particles through a phenomenon called base exchange, and secondly, it produces a definite cementing or stabilizing and hardening action of the available silicas, clays and oil field related materials found in the sump wastes.

Quantities by 1½% to 5% of the lime chemical composition injected into the waste materials by weight creates the following physical characteristics:
1. Reduction of plasticity index, dropping sharply as much as 3 or more fold in some instances.
2. Clay binder content decreases substantially (agglomerating effect).
3. Stabilizing action occurs even with over-optimum moisture content.
4. The lineal shrinkage and swell decrease markedly.
5. Compression strength increases considerably.
6. Load bearing values increase substantially.
7. Treated waste materials form water resistent barrier against both surface and capillary moisture, and sheds water even if only moderately compacted and graded.
8. Reduces water soluble carbonate content of oil base sludges and oil base chemicals, this reduction being caused by the calcium level in the lime chemical composition.
9. Deodorizes waste materials upon the initial injection of lime.

While the cementing action of lime would probably occur whether calcium oxide or calcium hydroxide is used, I prefer calcium oxide for its dehydrating action and the boiling and stirring caused by this hydration. The word "lime" used herein includes both calcium oxide and calcium hydroxide.

COMPACTION OF SUMP IN PLACE

Frequently there is no demand for the sump contents as fill material, in which case they may be compacted back in the sump itself. In this case the sump contents are handled as just mentioned and when they are dry enough for earth moving handling they are then put into the sump in layers and compacted in accordance with standard earth compaction methods, using sheepfoot rollers and other types of compactors, etc. I prefer to dry the mixture below optimum water content for compaction, and add water if it is needed. The finished surface of the compacted sump is then somewhat below ground level so that normal soil can be brought in to cover the compacted contents and the sump thoroughly eliminated from view. Crops and other covering can be grown over the sump contents in the fill placed above the contents.

RAPID ELIMINATION OF SUMPS

On some occasions there is need for great haste in eliminating sumps, as when an oil field lease is terminating, or for other reason the sump has to be eliminated rapidly. In this case, extreme care is taken to draw off all water that can be removed from the contents of the sump and thereafter an excess of calcium oxide is injected into the sump contents up to 5% by weight. This amount reduces the water content to the compaction range of 15% to 40% water content. Sump mixtures of 10% to 15% water content appear to be bone dry during manual handling. This excess results in dehydration of the sump contents, as well as stiffening the contents. The injection of calcium oxide must proceed rapidly so that the required amount can be injected before the stiffening occurs and makes impractical the use of further injection. When successfully carried out the contents are stiff enough to be handled by bulldozers, in which case the material can be moved to one side and then laid in rows and compacted in place without first removing the contents from the sump itself. A dredging scoop of the type illustrated in FIGS. 8 and 9 also may be used to reduce the thickness to a layer that permits compaction.

TREATMENT OF SEWAGE SUMPS

I have discovered that my lime treatment may be applied to the contents of sewage sumps with equal efficacy as with oil wells sumps. The material is converted into an earth-like material which can be handled in much the same fashion as the sewage sumps. Upon taking it to a dump site and compacting it the material can be converted into a hard, self-sealing type of material which does not ooze into the surrounding ground and does not appreciably leach out.

With regard to sumps wherein the sewage solids have been dehydrated and stored, the first step is to kill the sewage odor which makes the sump objectionable. Usually such sumps are covered with plastic sheet or other impervious sheet to confine the smell. If the dehydrated solids are too stiff to work with the equipment of FIGS. 1 through 4, water is added to get them into a sufficiently plastic state so that lime can be injected into the material. For some reason not presently known, the addition of a small amount of lime in the range of 10 to 15 pounds per cubic yard of sewage sludge kills the odor. Thereafter additional lime may be added to the contents, up to a maximum of 50 pounds per cubic yard of sludge. This amount of lime causes the sewage sludge to stiffen and then stabilize and causes it to turn into pellets about the size of golf balls. This material may be handled by any conventional earth-moving equipment and then may be safely moved on the highways, through towns, without any objectionable odor or other objection. When taken to the dump site the material may be laid in suitable layers and thereafter compacted. After several weeks this compacted material seems to form a self-sealing cement which sheds ground water and thereby reduces the leaching of the sewage contents into the soil.

USE OF SLUDGE CONTENTS AS SOIL

While still in an experimental stage, there are indications that the contents of oil well sumps and sewage sumps can be used for agricultural soil. For such uses the minimum amount of lime is used to permit handling of the sluges and they are thereupon spread upon agricultural soil or soil which is to be enhanced for agricultural use. Preferably the soil contents are loosely spread in layers about 6 inches thick without compaction. Thereafter they are sprayed with an acid to neutralize the alkalai of the lime and obtain a material that is relatively neutral. The particular acid used depends upon the cost of the acid, the ease of handling and the nearness of the soil location to running streams and other bodies of water that may be contaminated. Where minimum contamination of the soil is desired, nitric acid seems at present to be the most suitable acid. The use of sulphuric acid builds up sulphates in the soil which is objectionable in some situations. After the soil has been sprayed with an acid it is allowed to weather for about a week to two weeks and then is preferably deep plowed to mix it with the underlying soil on which it has been placed. The bituminous content of the soil seems to be well disbursed with this treatment and does not interfere with the growing crops. Sufficient acid must be added to result in a $p^H$ number no higher than 8.5.

Various modifications of the process and apparatus described herein will be apparent to those skilled in the art. There is disclosed in this specification only the presently preferred embodiments, as required by the Patent Rules. The appended claims, accordingly, include all variations and modifications that fall within the true spirit and scope of the invention.

I claim:

1. In combination with a sump of pasty material that has first and second oppositely disposed sides, a pile of powdered solid material at least partially in said sump adjacent said first side thereof, an apparatus for use in mixing said powdered solid material with said pasty material, said apparatus including:

a. first and second scoops, each of said scoops including a pair of side walls, forward and rearward end walls connected to said pair of side walls, a top supported from said pair of side wall and forward and rearward end walls, a transverse blade that extends downwardly and forwardly from said rearward end wall, and a plurality of apertures defined in said forward end wall, pair of side walls and said top;

b. first and second laterally spaced pulleys that are anchored at fixed positions adjacent said first side of said sump;

c. first and second laterally spaced, power-operated winches located at fixed positions adjacent said second side of said sump, said first and second winches capable of being operated concurrently to rotate in opposite directions;

d. a drag line that engages said first and second winches and extends across said sump to movably engage said first and second pulleys, said drag line including first and second reaches that have said first and second buckets interposed therein, with said winches when operated to rotate in opposite directions permitting one of said scoops to be moved upwardly on said pile and then moved towards said second side, with said scoop as it moves on said pile towards said second side having said blade thereof dig into said pile and direct solid material into said scoop, and said blade as said scoop moves towards said second side through said pasty material forcing said pasty material into said scoop whereupon it mixes with said powdered material in said scoop and the resulting mixture of said pasty material and powdered material being extruded outwardly from said scoop through said apertures, and as one of said first or second scoops moves towards said second side the other of said scoops moving towards said first side and said pile where it may be loaded with said powdered material to be subsequently mixed with said pasty material when it is moved towards said second side.

2. An apparatus as defined in claim 1 which in addition includes:

e. a first mobile unit that rotatably supports said first and second pulleys.

3. An apparatus as defined in claim 2 which in addition includes:

f. a second mobile unit that supports said first and second power-operated winches.

* * * * *